Aug. 25, 1964          F. PADULA          3,145,796
HYDRAULIC THRUSTER FOR VEHICLES AND CONTROL THEREFOR
Filed June 25, 1962          3 Sheets-Sheet 1
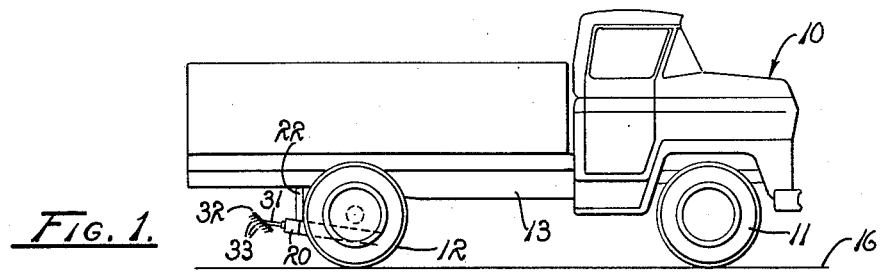
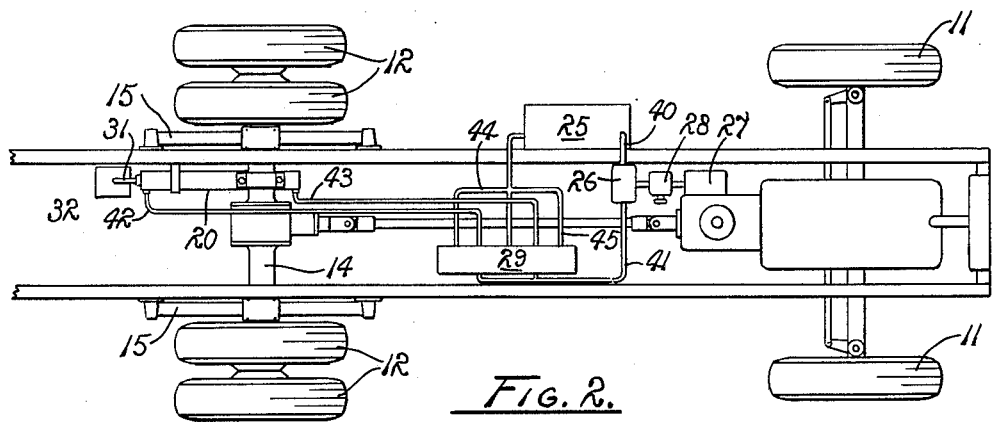
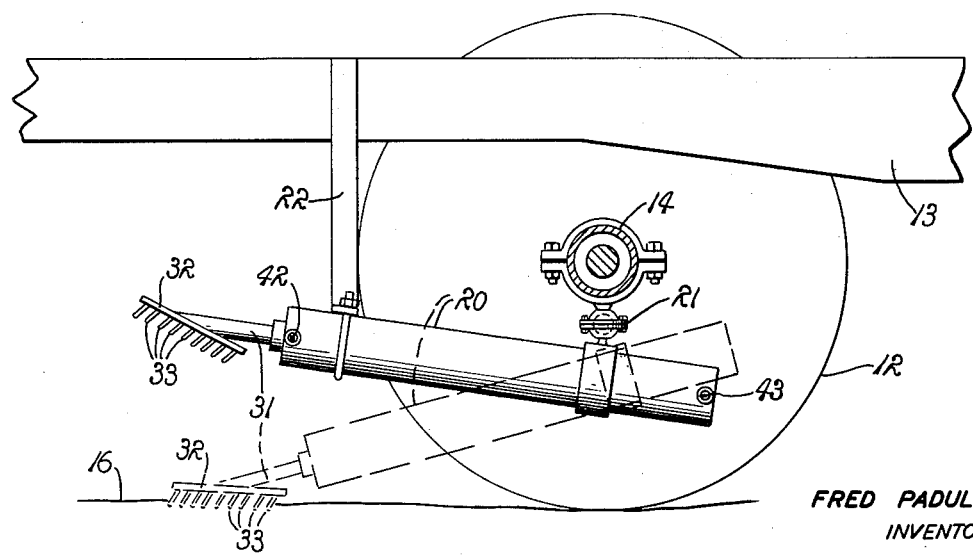
FRED PADULA
INVENTOR
HUEBNER & WORREL
ATTORNEYS

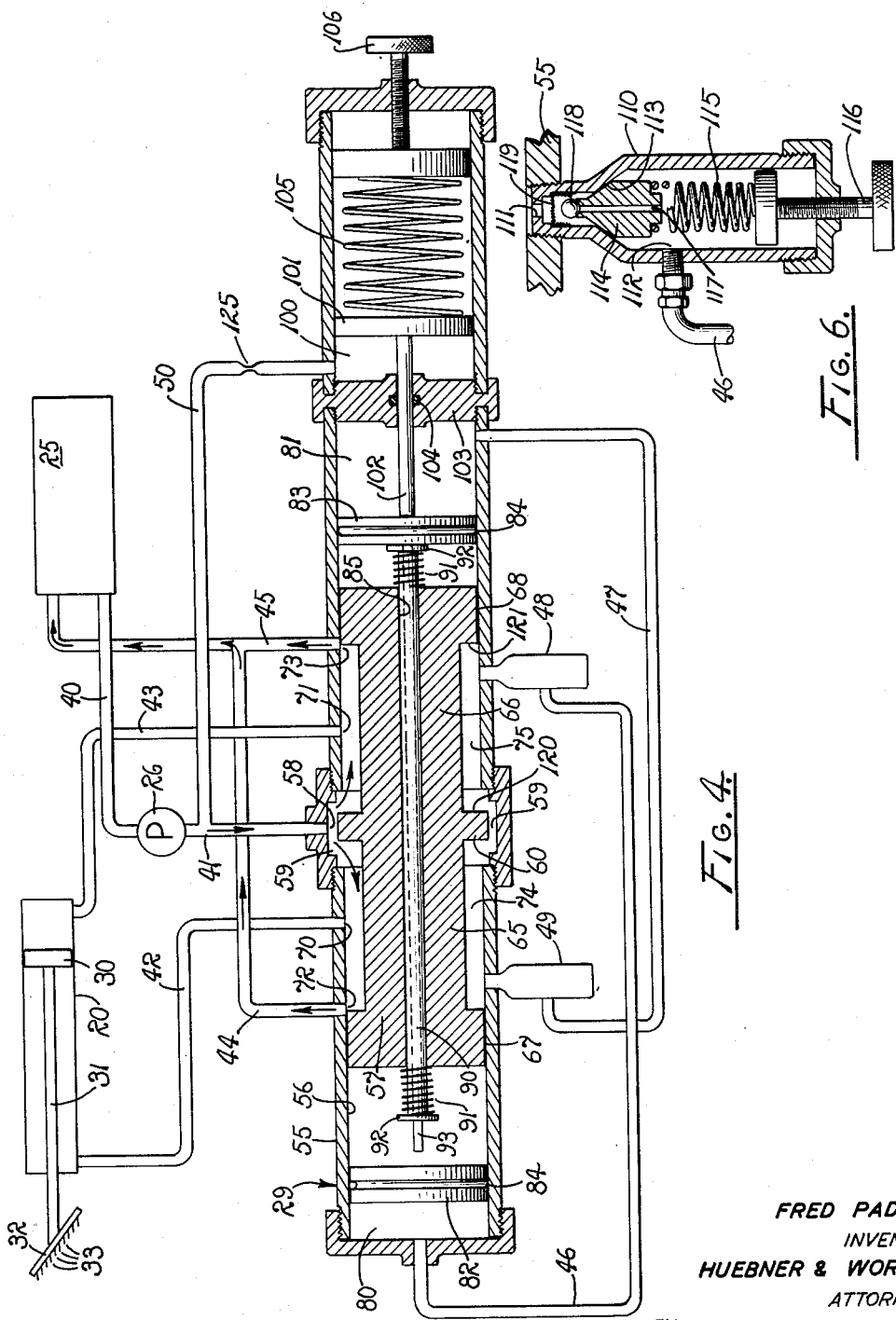

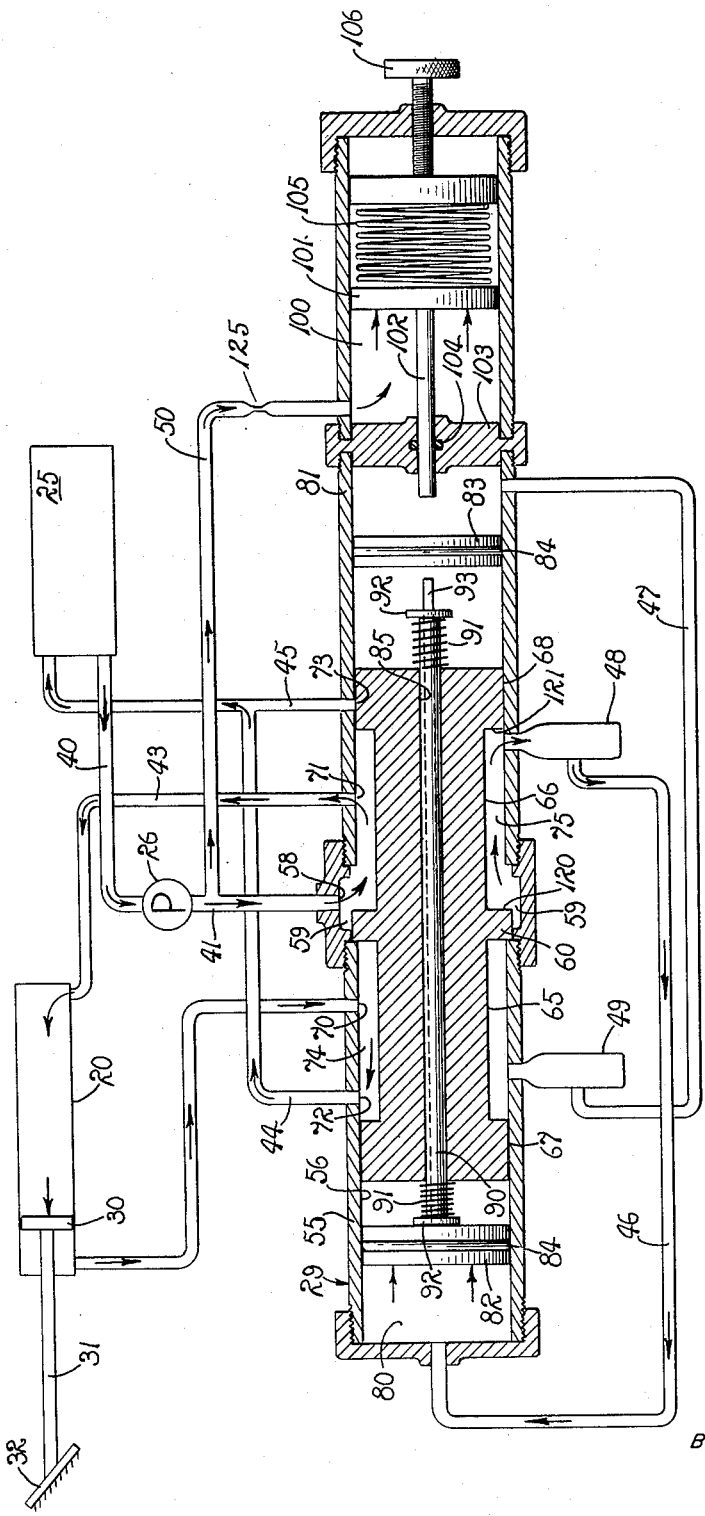

United States Patent Office 3,145,796
Patented Aug. 25, 1964

3,145,796
HYDRAULIC THRUSTER FOR VEHICLES AND
CONTROL THEREFOR
Fred Padula, 1305 Sandra Drive, Bakersfield, Calif.
Filed June 25, 1962, Ser. No. 204,974
10 Claims. (Cl. 180—8)

This invention relates to an hydraulically actuated thruster and an automatic control therefor. It is particularly adapted for use as a ground engaging thruster for vehicles unable to initiate self-motivation by regular means due to the condition of the ground or other surface on which the vehicle is supported.

Many types of vehicles such as tractors and heavy-duty trucks are operated on surfaces other than paved highways. This is generally referred to as off-highway operation and such operation is normally performed under a great variety of climatic and ground surface conditions. During periods of rainy weather or when such vehicles are attempting to traverse unprepared and soft ground surfaces, they frequently become stalled due to the inability of the supporting surface to offer a sufficient coefficient of friction for the drive wheels and, under certain conditions, the drive wheels become mired into the ground supporting surface. When such a stalled condition occurs, it is normally necessary to resort to the use of a separate tow vehicle to retrieve the stalled vehicle and to restore it to a status of self-motivation.

It is an object of the present invention to provide an hydraulically actuated thruster for vehicles and a control system for such a thruster to propel a stalled vehicle incapable of initiating self-motivation by regular means.

Another object is to provide a self-reversing control system for an hydraulically actuated thruster.

Another object is to provide, in a control system for an hydraulic thruster, a pilot operated control valve adapted for automatic cyclic operation at a selectively adjustable pressure.

A further object of the invention is to provide an hydraulic thruster and an intergrated actuating and control system therefor which will insure continuous, cyclic, self-reversing actuation of the thruster during operation.

A still further object of the invention is to provide an hydraulically operated mechanism to assist recovery of a stalled vehicle and a control system for the mechanism to insure that, during operation, the mechanism will apply to such a vehicle a series of power impulses of a predetermined, selectively adjustable value.

In the drawings:

FIG. 1 is a view in side elevation of a conventional truck equipped with the hydraulically actuated thruster and automatic control of the present invention.

FIG. 2 is a top plan view of the chassis of the truck of FIG. 1, enlarged in scale and diagrammatically illustrating the hydraulic components of the thruster and control embodying the principles of the present invention.

FIG. 3 is a fragmentary view in side elevation showing in full lines the hydraulic thruster secured to the chassis, and in dashed lines lowered to an operative ground engaging position.

FIG. 4 is a schematic illustration of the hydraulic circuitry and control valve employed in operating the hydraulic thruster. The valve is shown in a neutral centered position.

FIG. 5 is similar to FIG. 4 except that the control valve is shown in a position to admit actuating pressure fluid to the thruster.

FIG. 6 is an enlarged view in longitudinal section of one of the pressure responsive two-way check valves employed in the control circuit.

Referring to FIGS. 1, 2, and 3 of the drawings, the device of the present invention is illustrated in connection with a conventional truck 10 supported on the surface of the ground by means of front and rear wheels 11 and 12, respectively. The chassis of the truck includes a conventional frame 13 which is supported at its rearward end by means of a rear axle housing 14 and conventional leaf springs 15 interposed between the housing and the frame. The truck is merely representative of vehicles generally on which the invention is adapted for use.

A surface of support 16, illustrated in FIG. 1, in normal off-highway operation can extend through a range of a variety of soils, the density and coefficient of friction varying in accordance with different types encountered and the climatic conditions to which the soil had been exposed. As will be explained, the device of the present invention is ideally suited for use on vehicles expected to encounter a ground surface which at times is unable to support the vehicle in a manner to permit self-motivation. In addition, the surface may be extremely wet and slippery, and thereby reduce the coefficient of friction below a value to provide the required traction at the rear drive wheels.

The hydraulically actuated thruster of the present invention is in the form of a conventional ram 20 mounted for universal depending movement on the rear axle housing 14 by means of a ball and socket mounting bracket 21. During normal operation of the vehicle during which the thruster is unnecessary, a transporting yoke 22 maintains it in a raised inoperative position, as illustrated in full lines in FIG. 3.

Referring to FIG. 2 of the drawings, the hydraulic circuit of the present invention includes a reservoir tank 25 and a pump 26, driven by the engine of the truck through a conventional power take-off 27. The pump is selectively operated through a controlling clutch 28. A control valve 29 is incorporated in the circuit which permits automatic operation of the ram 20 while the pump is being driven, and also provides for selectively adjusting the maximum force to be transmitted to the truck during operation of the ram 20.

The ram 20 includes a conventional piston 30 longitudinally slidably received in the ram, and an axially extended rod 31 secured to the piston and carrying a ground engaging shoe 32. The shoe is angularly related to the rod; the angular relation being such to permit full engagement of ground engaging teeth 33 carried by the shoe during periods when the ram is lowered to the position shown in dashed lines in FIG. 3.

Referring to FIGS. 2 and 4, the hydraulic circuit comprises an input line 40 leading from the reservoir 25 to the pump 26 and a pump output line 41 in fluid communication with the control valve 29. A pair of pressure supply lines 42 and 43 provides a supply of pressure fluid selectvely at opposite ends of the actuating ram 20. A pair of return lines 44 and 45 completes the hydraulic circuit between the reservoir 25, pump 26, actuating ram 20, and the control valve 29. The control circuit of the valve 29 includes a pair of pilot piston supply lines 46 and 47 connected between opposite ends of the control valve and respective pressure responsive, normally closed, two-way check valves 48 and 49. A pressure supply line 50 interconnects the pump output line 41 and an accumulator subsequently to be described.

As shown in FIGS. 4 and 5, the control valve is enclosed in a longitudinally extended cylindrical housing 55 provided with an axial bore 56. Longitudinally slidably received within the bore is a valve spool 57. An inlet port 58 in communication with the pump output line 41 provides an entry for pressure fluid into an annular area 59 of a predetermined axial dimension. A central land 60 on the valve spool is shown as being in a central position in FIG. 4 and partially blocking the inlet port 58. It is to be noted that the pressure fluid being admitted through the port 58 is free to flow to opposite ends of the valve housing without being restricted or controlled by the central land 60.

Axially extended on opposite sides of the central land 60 are stem portions 65 and 66 of the valve spool 57 of reduced radial dimensions to provide radial clearance between the stem and the housing. At opposite ends of the spool are respective terminal lands 67 and 68 received within the axial bore 56 of the housing in sealing, substantially fluid-tight relationship. In actual practice, seals such as conventional O-rings or other lip-type seals may be employed, but are not shown in the schematic illustration. Longitudinally spaced on opposite sides of the central inlet port 58 are respective pressure discharge ports 70 and 71, which alternatively serve as pressure supply and return flow ports to one end of the actuating ram 20 depending upon the position of the valve spool 57. Longitudinally spaced from each of the pressure discharge ports is a pair of return flow ports 72 and 73 which provides a means of fluid flow returning to the reservoir tank 25. It will be observed that the stem portions 65 and 66 provide respective annular pressure chambers 74 and 75 at opposite axial positions relative to the inlet port 58, and each pressure chamber provides selective communication between a conduit connected to the ram 20, a return line to the reservoir 25, and the pressure output line leading from the pump 26. The communication established between these lines is dependent upon valve spool position to be described below.

The valve housing 55 extends axially a distance greater than the valve spool 57 to provide a pair of pilot pressure chambers or cylinders 80 and 81 at opposite ends of the housing. Two pilot pistons 82 and 83 are each longitudinally reciprocably received in the axial bore 56 adjacent to their respective pressure chambers. Each of the pistons is provided with means to insure a sealing relationship with the bore, and as illustrated, the means are in the form of conventional O-rings 83 and 84 provided in annular grooves in each of the respective pilot pistons.

Longitudinally slidably received in a central axial bore 85 provided in the valve spool 57 is a tubular bushing 90 of a length greater than the valve spool. On each of the projecting ends of the bushing is carried a compression spring 91 retained by means of an engaging head 92, or nut, screw-threadably mounted on the bushing. Slidably received within the bushing is an axially extended rod 93 of a length greater than the bushing, and whose function is to shift the pilot pistons 82 and 83 during operation of the control valve.

At one end of the valve housing is provided an accumulator pressure chamber 100 in fluid communication with the pressure supply line 50 and having an accumulator piston 101 slidably retained therein. Rigidly secured to the piston is a striker rod 102 which extends through a terminal wall 103 in the pilot piston chamber. An O-ring 104 is received within an annular recess in the wall 103 and circumscribes the rod 102 in sealing relationship. A compression spring 105 engages the accumulator piston to urge the striker rod 102 toward the pilot piston 83. The pre-load on the spring 105 may be varied by manipulation of the adjustment nut 106.

Referring to FIG. 6, the details of the pressure responsive valves 48 and 49 are shown, and in view of the fact that both of these valves are identical, only one is described in detail. Each of the pressure responsive valves has an external body 110 having an inlet port 111 to provide fluid communication with its respective annular pressure chamber in the control valve housing 55. An outlet port 112 provides fluid communication with the respective pilot piston pressure chamber to which it is connected by one of the supply lines 46 and 47. It can be seen that the valve 48 is in communication with the annular pressure chamber 75 and provides a supply of pressure fluid to chamber 80 through line 46 upon opening of the valve 48. Likewise, valve 49, upon opening, provides a supply of pressure fluid to chamber 81 through line 47 leading from chamber 74.

Each of the valves 48 and 49 is normally closed and is set to open at a predetermined pressure value. An internal valve seat 113 is normally closed by a piston 114 urged into engagement with the seat by means of a biasing spring 115. The pre-load on the biasing spring is selectively adjusted by means of a thumb-screw, indicated at 116. The piston is provided with a return bleed passageway 117 which is normally closed by a ball check 118. The check is retained in a position immediately adjacent to the bleed passageway by any suitable means, such as a straining screen, indicated at 119. If desired, the check 118 can be biased to a closed position by means of a low-rate spring, not shown.

*Operation*

The operation of the described embodiment of the subject invention is believed to be readily apparent and is briefly summarized at this point. Assuming that the truck 10 has been used in attempting to negotiate a ground surface, indicated at 16, which does not provide the necessary traction at the rear drive wheels 12 of the truck 10, the hydraulic thruster is then prepared for operation by lowering the ram 20 to a position shown in dashed lines in FIG. 3 so that the shoe 32 is in a ground engaging position. The controlling clutch 28 is then engaged to drive the pump 26 and provide a supply of pressure fluid through line 41.

Assuming that the control valve spool 57 is in the position shown in FIG. 4, the pressure fluid flowing from the pump will be substantially divided by the central control land 60 to divert flow to both of the annular pressure chambers 74 and 75 to be returned to the reservoir tank 25 through the partially open return ports 72 and 73. In the event that the valve spool assumes such a centrally located position, the compression spring 105 is released by the accumulator piston 101 since a sufficient pressure will not be available through line 50 to supply the pressure chamber 100 and compress the spring 105. Accordingly, the piston 101 will move to the left, as viewed in FIG. 4, to permit the striker rod 102 to engage the freely slidable pilot piston 83 to move the valve spool to the left. Such a position is shown in FIG. 5 and the pressure fluid flow pattern resulting from such a valve spool position is subsequently described below.

Assuming that the valve spool 57 has been moved to the limit of its travel in a direction to the left, as viewed in FIG. 5, pressure fluid from the pump flowing through output line 41 and inlet port 58 is directed through line 43 to the right of the actuating ram, as viewed in FIG. 5. The right terminal land 68 of the valve spool effectively blocks the return port 73 to prevent escape of the pressure fluid to the reservoir 25. The return flow from the left end of the actuating ram is returned through line 42 through the annular pressure chamber 74 and the return line 44 to the reservoir tank 25. A supply of pressure fluid is admitted to the accumulator pressure chamber 100 through line 50 to move the piston 101 to the right, as viewed in FIG. 5, compressing the spring 105 and thereby cocking the accumulator to insure that the valve spool cannot remain in a central position, as shown in FIG. 4.

Referring further to FIG. 5, and assuming that the actuating ram 20 has been extended to the limit of its travel so that the piston 30 is at the far left end of the ram, as viewed in FIG. 5, the pump 26 continues to supply fluid under pressure to the annular chamber 75 and the control valve. Assuming further that the pressure responsive valve 48 has been adjusted to open at a pressure value below the maximum pressure capacity of the pump, the valve piston 114 is urged away from the valve seat 113 to permit pressure fluid to flow through line 46 to the pilot piston pressure chamber 80. Accordingly, the freely slidable pilot piston 82 is moved to the right, as viewed in FIG. 5 contacting the rod 93 which moves the pilot piston 83 at the opposite end of the valve housing also to the right. Further flow of pressure fluid into the chamber 80 causes further movement of the piston 82 to the right to compress the spring 91. Initial movement of the valve spool 57 is resisted because the central land 60 has a larger area 120 exposed to the fluid under pressure in chamber 75 than has the terminal land 68 in the area 121. However, since the floating pilot piston 82 has a greater effective area than the differential between areas 120 and 121, the initial resistance to movement is overcome and the valve spool 57 is shifted to the right, as viewed in FIG. 5. Upon reaching a central position, as shown in FIG. 4, the pressure in both of the chambers 74 and 75 is reduced to that resulting from the restriction through the passageway in the system. Upon the pressure falling below the setting of valve 48, the spring 115 urges the piston 114 into contact with the valve seat 113 and prevents further flow through valve 48 to the pilot piston pressure chamber 80. Accordingly, no further pressure fluid is available to move the pilot piston 82 to the right, however, the energy stored in the spring 91 is sufficient to urge the valve spool 57 further to the right until the central land 60 blocks flow of pressure fluid to the chamber 75. At this point, the area differential existing between the central land 60 and the terminal land 67 is adequate to move the valve spool 57 to the limit of its travel to the right, as viewed in FIGS. 4 and 5 and to maintain it in such a position. To preclude the possibility of the accumulator piston 101 from being released at this time and thus preventing movement to the right, a suitable restriction, indicated at 125, may be required in line 50, depending upon the characteristics of the system.

As soon as the valve spool 57 has been moved to the limit of its travel to the right, as shown in FIGS. 4 and 5, the pressure fluid is admitted to the left end of the actuating ram through line 42. This retracts the ground engaging shoe 32 until the piston 30 reaches the limit of its travel. Subsequently, the pressure increases in the chamber 74 until it exceeds the setting of the valve 49 whereupon valve 49 opens as described above in connection with valve 48 to admit pressure fluid through line 47 to the pilot piston cylinder 81. The valve spool is thereupon moved to the left in the same manner as described in connection with movement to the right by the piston 82.

The rod 93 engages the floating piston 82 under the influence of the pilot piston 83 and forces fluid from the pressure chamber 80 through line 46 and into the chamber 75 through the return bleed passageway 117. Since the valve check 118 prevents flow only in the opposite direction, the pilot pressure chamber 80 is relieved of excess fluid to permit the aforementioned described movement of the piston 82.

During the operation of the hydraulic circuit described above, it can be seen that the shoe 32 is alternately engaged with the supporting surface 16 of the vehicle and the hydraulic ram 20 extended either to its maximum linear limits or to a position wherein a predetermined force is reached. Accordingly, a force is exerted upon the vehicle which cannot exceed that force resulting from a pressure in the system corresponding to the predetermined value selectively set in the valves 48 and 49. As soon as this pressure value is reached in the system, the valve spool 57 is shifted to admit fluid to the opposite end of the ram and repeat the cycle.

So long as the pump 26 is actuated, the ram operated in successive cycles and the shoe engaging the ground propels the vehicle forwardly in increments corresponding to the length of the stroke of the ram. If desired, the ball and socket mounting 21 permits a reversal of the direction of propelling by the ram, so that the vehicle may be moved rearwardly.

Accordingly, an hydraulically actuated thruster and an automatic control therefor have been provided which automatically operate to propel a vehicle in a given direction at predetermined increments of travel or until a predetermined force value has been reached.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a vehicle having a chassis including a frame and ground engaging wheels, an hydraulically actuated thruster and control therefor comprising an elongated hydraulically actuated ram having a piston mounted therein for longitudinal reciprocal movement between predetermined limits; a ground engaging pressure shoe operatively connected to said piston; means mounting the ram on the vehicle chassis to permit the shoe to engage the ground and to effect movement of the vehicle upon reciprocation of the piston; a source of pressure fluid; a reservoir; conduit means interconnecting said source, reservoir and opposite ends of the ram; a pilot-operated control valve interposed in said conduit means and shiftable alternatively to admit and to block flow from said source to the opposite ends of said ram; pilot piston-cylinder assemblies operatively connected to said valve; a control valve operating circuit including two separate pressure responsive valves each being in fluid communication with a respective end of said ram; and conduit means interconnecting each of said pressure responsive valves with a respective pilot piston cylinder-assembly and arranged to shift said control valve to block flow of pressure fluid to a pressure responsive valve and to one of the ends of the ram upon a predetermined pressure being reached in said one end of the ram.

2. In combination with a vehicle having a chassis including a frame supported by ground engaging wheels, an hydraulically actuated thruster and control therefor comprising an elongated hydraulically actuated ram having a piston mounted therein for longitudinal reciprocal movement between predetermined limits; a ground engaging shoe operatively connected to said piston; means mounting the ram on the chassis to permit the shoe to engage the ground and to effect movement of the vehicle upon extension of the ram; an hydraulic pump as a source of pressure fluid; a fluid reservoir in fluid admitting relationship to the pump; a pilot operated control valve having therein a fluid admission port, a plurality of pressure discharge ports, and at least one return port; conduit means connecting said admission port with the pump, said discharge ports with opposite ends of the ram, and said return port with the reservoir; a flow control element in said control valve shiftable alternatively to admit and to block flow of fluid from the pump through said discharge and return ports respectively to the opposite ends of the ram and the reservoir; pilot piston-cylinder assemblies operatively connected with said element; and a pilot operating fluid circuit in control relationship with said element and including valve means responsive to pressure in one end of said ram to admit pressure fluid to one of said pilot assemblies thereby to shift said element to block flow of fluid to said one end of the ram and to admit fluid to the other end.

3. In combination with a vehicle having a chassis including a frame supported by ground engaging wheels, an hydraulically actuated thruster and control therefor comprising an elongated hydraulically actuated ram having a piston mounted therein for longitudinal reciprocal movement between predetermined limits; a ground engaging shoe operatively connected to said piston; means mounting the ram on the chassis to engage the ground and to effect movement of the vehicle upon extension of the ram; an hydraulic pump as a source of pressure fluid; a fluid reservoir in communication with the pump; a pilot operated control valve comprising an elongated housing provided with an axial bore and a fluid admission port and a plurality of discharge ports in communication therewith, and a flow-control spool longitudinally slidably received in the bore and having a plurality of longitudinally spaced lands to block fluid flow through certain of said discharge ports depending upon the position of said spool; conduit means connecting said admission port with the pump, one of said discharge ports with one end of the ram, another of said discharge ports with the other end of the ram, and the remainder of said discharge ports with the reservoir; pilot piston-cylinder assemblies operatively connected to said spool to shift the same upon actuation of either of said assemblies; pilot operating conduit means establishing communication between said pump and said assemblies; normally closed valve means interposed in said pilot operating conduit means and blocking flow therethrough; a pair of pressure responsive means to open the last said valve means at a predetermined pressure value; and pressure sensing conduit means establishing communication respectively between one end of said ram and one of said pressure responsive means and between the other end of the ram and the other of said pressure responsive means.

4. In combination with a vehicle chassis an elongated hydraulically actuated ram having a piston mounted therein for longitudinal reciprocal movement between predetermined limits a rod secured to the piston and extended from the ram; a ground engaging shoe carried by the rod; means mounting the ram on the chassis to permit the shoe to engage the ground and to effect movement of the vehicle upon extension of the ram; an hydraulic pump as a source of pressure fluid; a fluid reservoir in fluid admitting relationship to the pump; and a flow control fluid circuit connecting the pump, reservoir, and ram for automatic cyclic extension and contraction thereof, said control circuit comprising an elongated valve housing having an axial bore provided therein; a valve spool longitudinally slidably received in the bore, and having a central flow control land connected to opposite terminal lands by means of radially reduced stem portions; the valve housing having a central inlet port, a pair of longitudinally spaced pressure discharge ports, one on opposite sides of the inlet port, and a pair of longitudinally spaced return ports, one on opposite sides of the inlet port, all of said ports and said valve lands being arranged so that in a neutral position the central flow control land partially blocks the inlet port and the opposed terminal lands each partially block the respective return port, and respective annular pressure chambers defined by the connecting stems and the valve housing are in fluid communication with the discharge ports; a conduit connecting the pump and the inlet port; conduits respectively connecting each of the discharge ports with opposite ends of the ram; conduit means connecting the return ports with the reservoir; a pilot cylinder provided at opposite ends of the housing and defining a cylindrical bore; a freely slidably pilot piston longitudinally reciprocably received in the bore; a conduit connecting an annular pressure chamber at one side of the central flow control land with a pilot cylinder at the other side of said land; a pressure responsive flow control valve interposed in each of said conduits whereby the pressure rise in one of said annular pressure chambers incident to the piston in the ram reaching one of said predetermined limits opens the pressure responsive flow control valve to admit pressure fluid to the pilot cylinder and shift the valve spool to an axial position blocking flow from the inlet port to the discharge port in communication with said one end of the ram.

5. The combination according to claim 4 wherein said pressure responsive flow control valves each comprise a valve body having an axial bore therein providing communication with respective inlet and outlet ports; a valve piston normally blocking flow between the ports and selectively biased into a blocking position by means of a spring; and pressure bleed passageways constituting an auxiliary means of communication from the discharge port to the inlet port and provided in the valve piston; and a one-way check valve closing said passageway incident to pressure existing in the inlet port.

6. The combination according to claim 4 wherein one end of the valve housing is extended to provide an accumulator pressure chamber defined by a transverse wall adjacent to said pilot chamber and provided with an axial bore therein and a piston longitudinally slidably received in the valve housing bore and spaced from said wall; a striker pin secured to the piston and extending through said bore toward the free pilot piston disposed in said pilot chamber; a spring disposed in the valve housing outboard of the accumulator pressure chamber and normally urging the striker pin into engagement with the free pilot piston; and conduit means providing fluid communication between the pump and said accumulator pressure chamber to compress said spring and retract said striker pin at a predetermined value of pressure.

7. A hydraulically actuated thruster and automatic control therefor comprising an elongated hydraulically actuated ram having a piston mounted thereon for longitudinal reciprocal movement between predetermined limits; a source of pressure fluid; conduit means interconnecting said source and opposite ends of the ram; a pilot operated control valve in said conduit means and shiftable alternatively to admit and to block flow from said source to the opposite ends of said ram; pilot piston-cylinder assemblies operatively connected to said valve; a control valve operating circuit including two separate pressure responsive valves, each being in fluid communication with a respective end of said ram; and conduit means interconnecting each of said pressure responsive valves with a respective pilot piston-cylinder assembly and arranged to shift said control valve to block flow of pressure fluid to one of the ends of the ram and to a respective pressure responsive valve upon a predetermined pressure being reached in said one end of the ram.

8. The combination according to claim 7 wherein said control valve includes an elongated housing having opposite ends and wherein one end of the valve housing is extended to provide an accumulator pressure chamber defined by a transverse wall adjacent to said pilot chamber and provided with an axial bore therein and a piston longitudinally slidably received in the valve housing bore and spaced from said wall; a striker pin secured to the piston and extending through said bore toward the free pilot piston disposed in said pilot chamber; a spring disposed in the valve housing outboard of the accumulator pressure chamber and normally urging the striker pin into engagement with the free pilot piston; and conduit means providing fluid communication between the source and said accumulator pressure chamber to compress said spring and retract said striker pin at a predetermined pressure.

9. In combination with a source of fluid pressure, including a reservoir, and an elongated hydraulically actuated ram having a piston mounted therein for longitudinal reciprocal movement between predetermined limits adjacent to the opposite ends thereof, an automatic control for said ram comprising a pilot operated control valve including an elongated housing having therein a fluid admission port, a plurality of pressure discharge ports, and at least one return port; conduit means connecting said admission port with said source of pressure, said discharge ports with respective opposite ends of the ram, and said return port to the reservoir; a flow control element in said control valve shiftable alternatively to admit and to block flow of fluid from the source through said discharge and return ports respectively to the opposite ends of the ram and the reservoir; pilot piston-cylinder assemblies operatively connected with said control element; and a pilot operating fluid circuit in control relationship with said element and including valve means responsive to pressure in one end of said ram to admit pressure fluid to one of said pilot piston-cylinder assemblies thereby to shift said element to block flow of fluid to said one end of the ram and to admit fluid to the other end.

10. The combination according to claim 9 wherein one end of the valve housing is extended to provide an accumulator pressure chamber defined by a transverse wall adjacent to said pilot chamber and provided with an axial bore therein and a piston longitudinally slidably received in the valve housing bore and spaced from said wall; a striker pin secured to the piston and extending through said bore toward the free pilot piston disposed in said pilot chamber; a spring disposed in the valve housing outboard of the accumulator pressure chamber and normally urging the striker pin into engagement with the free pilot piston; and conduit means providing fluid communication between the pump and said accumulator pressure chamber to compress said spring and retract said striker pin at a predetermined value of pressure.

References Cited in the file of this patent
UNITED STATES PATENTS

| | | |
|---|---|---|
| 278,822 | Richardson | June 5, 1883 |
| 777,260 | Landes | Dec. 13, 1904 |
| 1,298,703 | Havens | Apr. 1, 1908 |
| 2,298,457 | Berges | Oct. 13, 1942 |
| 2,302,232 | McNeil | Nov. 17, 1942 |
| 2,878,882 | Bernotas | Mar. 24, 1959 |